US012060842B2

United States Patent
Shah

(10) Patent No.: US 12,060,842 B2
(45) Date of Patent: Aug. 13, 2024

(54) MISFIRE CLASSIFICATION METHOD AND CONTROL UNIT FOR AN INTERNAL COMBUSTION ENGINE

(71) Applicant: Caterpillar Energy Solutions GmbH, Mannheim (DE)

(72) Inventor: Darshit Shah, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/021,023

(22) PCT Filed: Aug. 4, 2021

(86) PCT No.: PCT/EP2021/025297
§ 371 (c)(1),
(2) Date: Feb. 13, 2023

(87) PCT Pub. No.: WO2022/033718
PCT Pub. Date: Feb. 17, 2022

(65) Prior Publication Data
US 2023/0296063 A1    Sep. 21, 2023

(30) Foreign Application Priority Data

Aug. 12, 2020    (GB) .................................. 2012545

(51) Int. Cl.
*F02D 35/02*    (2006.01)
*F02D 19/02*    (2006.01)

(52) U.S. Cl.
CPC ......... *F02D 35/025* (2013.01); *F02D 19/025* (2013.01); *F02D 2200/1015* (2013.01)

(58) Field of Classification Search
CPC ........ F02D 19/02; F02D 19/025; F02D 35/02; F02D 35/025; F02P 17/02; F02P 23/04; F02P 5/04; F02P 5/045
See application file for complete search history.

(56) References Cited

U.S. PATENT DOCUMENTS 4,887,574 A * 12/1989 Kuroiwa ............. G01M 15/108
  123/406.27
5,415,028 A *  5/1995 Nishimura ............ G01M 15/11
  73/114.04

(Continued)

FOREIGN PATENT DOCUMENTS

EP    2693032 A1    2/2014
EP    2843221 A1    3/2015

(Continued)

OTHER PUBLICATIONS

International Search Report related to Application No. PCT/EP2021/025297; reported on Nov. 18, 2021.

(Continued)

*Primary Examiner* — John Kwon
*Assistant Examiner* — Johnny H Hoang

(57) ABSTRACT

Misfire classification method for an internal combustion engine, comprising: a step of determining whether the engine is subjected to a misfire; a step of obtaining at least one temperature signal being indicative of a temperature prevailing in a cylinder of the engine; and a step of determining a type of misfire in dependence on the obtained temperature signal.

20 Claims, 6 Drawing Sheets

(56) References Cited

U.S. PATENT DOCUMENTS

| | | | |
|---|---|---|---|
| 5,471,869 A * | 12/1995 | Kuroda | G01M 15/11 73/114.04 |
| 5,471,870 A * | 12/1995 | Kuroda | G01M 15/11 73/114.02 |
| 7,292,933 B2 | 11/2007 | Christensen | |
| 7,571,640 B2 | 8/2009 | Andrews | |
| 7,899,608 B1 | 3/2011 | Pederson et al. | |
| 8,166,805 B1 | 5/2012 | Thompson | |
| 10,029,692 B2 | 7/2018 | Nakoji et al. | |
| 10,118,608 B1 * | 11/2018 | Dudar | B60W 20/50 |
| 10,337,416 B2 | 7/2019 | Surnilla | |
| 2007/0215111 A1 | 9/2007 | Surnilla | |
| 2009/0080492 A1 | 3/2009 | Takeuchi | |
| 2014/0136085 A1 * | 5/2014 | Martin | F02P 5/152 701/111 |
| 2016/0040644 A1 | 2/2016 | Martin et al. | |
| 2016/0333807 A1 | 11/2016 | Pathan et al. | |
| 2018/0135548 A1 * | 5/2018 | Stefanopoulou | F02D 35/024 |
| 2019/0162159 A1 * | 5/2019 | Dudar | F02P 17/00 |

FOREIGN PATENT DOCUMENTS

| | | |
|---|---|---|
| EP | 3239506 A1 | 11/2017 |
| JP | 05222994 H | 8/1993 |
| WO | 2016183409 A1 | 11/2016 |

OTHER PUBLICATIONS

Great Britain Search Report related to Application No. GB2012545.6 reported on Jan. 8, 2021.

Roy Ripple, "Misfire Detection; Vehicle Service Pros", Jan. 1, 2020, pp. 1-12, XP055858196, Retrieved from the Internet: URL:https://www.vehicleservicepros.com/collision-repair/on-the-shop-floor/article/21171135/misfire-detection.

* cited by examiner

MISFIRE CLASSIFICATION METHOD AND CONTROL UNIT FOR AN INTERNAL COMBUSTION ENGINE

CROSS-REFERENCE TO RELATED APPLICATION

This Application is a 35 USC § 371 US National Stage filing of International Application No. PCT/EP2021/025297 filed on Aug. 4, 2021 which claims priority under the Paris Convention to Great Britain Patent Application No. No. 2012545.6 filed on Aug. 12, 2020.

TECHNICAL FIELD

The present invention refers to a misfire classification method for an internal combustion engine and to a control unit of an internal combustion engine for carrying out such a misfire classification method.

TECHNOLOGICAL BACKGROUND

For ensuring high efficiency, internal combustion engines are designed to combust an air fuel mixture within its cylinders in a timely controlled manner so as to, under ideal operating conditions, develop peak pressure in its cylinders at ideal time for maximum recovery of work from expanding gases generated upon combustion. For doing so, ignition of the air fuel mixture and propagation of a flame front within the combustion chamber needs to take place according to a strictly defined pattern. However, any deviation from ideal operating conditions may lead to a less favorable combustion of the air fuel mixture and thus to a deterioration of the engine's performance and efficiency.

During operation, the engine, i.e. individual cylinders thereof, may be subjected to poor or no combustion such that no significant energy conversion takes place and thus no significant pressure and temperature rises are experienced in individual cylinders. These undesired and unintended phenomena constitute a malfunction of the engine and may generally be referred to as misfire or combusting misfire.

Combustion misfire may be caused by many different reasons. For example, a malfunction of an ignition system, i.e. a spark plug, may cause poor or no combustion in individual cylinders of the engine. Alternatively, an intake system of the engine may be subjected to a malfunction such that the air fuel mixture fed into combustion chambers of the engine has an unfavorable composition, e.g. having an air fuel ratio lying outside of a combustible range.

Besides deterioration of engine's performance and efficiency, misfire may lead unburnt fuel to enter the exhaust system of the engine. In this way, upon expelling unburnt fuel through the exhaust system into environment, misfire may contribute to damages of catalytic converters present in the exhaust system and to environmental pollution. Further, analysis of misfire phenomena is a key enabler for many failure mode detection and emission relevant control approaches. As a result, the detection and evaluation of misfire phenomena occurring during operation of the engine has constantly been in focus among different engines types and applications.

From the prior art, misfire detection methods are known for identifying continuous misfire conditions within individual cylinders, i.e. misfires which occur continuously among subsequent operating cycles of the engine, for example by identifying defect spark plugs of an ignition system. However, the known approaches are not suitable of detecting malfunction conditions in which poor combustion or intermittent misfire phenomena, i.e. which occur intermittently or during only a certain number of operating cycles, take place.

SUMMARY OF THE INVENTION

Starting from the prior art, it is an objective to suggest an improved misfire monitoring method for an engine, which in particular enables to more accurately evaluate and classify misfire phenomena occurring during operation. A further objective is to provide a control unit of an internal combustion engine configured for carrying out such a misfire monitoring method.

These objectives are solved by means of the subject matter according to the independent claims. Preferred embodiments are set forth in the present specification, the Figures as well as the dependent claims.

Accordingly, a misfire classification method for an internal combustion engine is provided which comprises a step of determining whether the engine is subjected to a misfire, a step of obtaining at least one temperature signal being indicative of a temperature prevailing in a cylinder of the engine, and a step of determining the type of misfire in dependence on the obtained temperature signal.

Furthermore, a control unit of an internal combustion engine for classifying misfire phenomena occurring during operation of the engine. The proposed control unit is configured to perform the misfire detection method as described above. Accordingly, technical features which are described in connection with the misfire detection method in the present disclosure may also refer and be applied to the proposed control unit, and vice versa. Specifically, the control unit is configured for determining whether the engine is subjected to a misfire, for obtaining at least one temperature signal being indicative of a temperature prevailing in a cylinder of the engine, and for determining the type of misfire in dependence on the obtained temperature signal.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
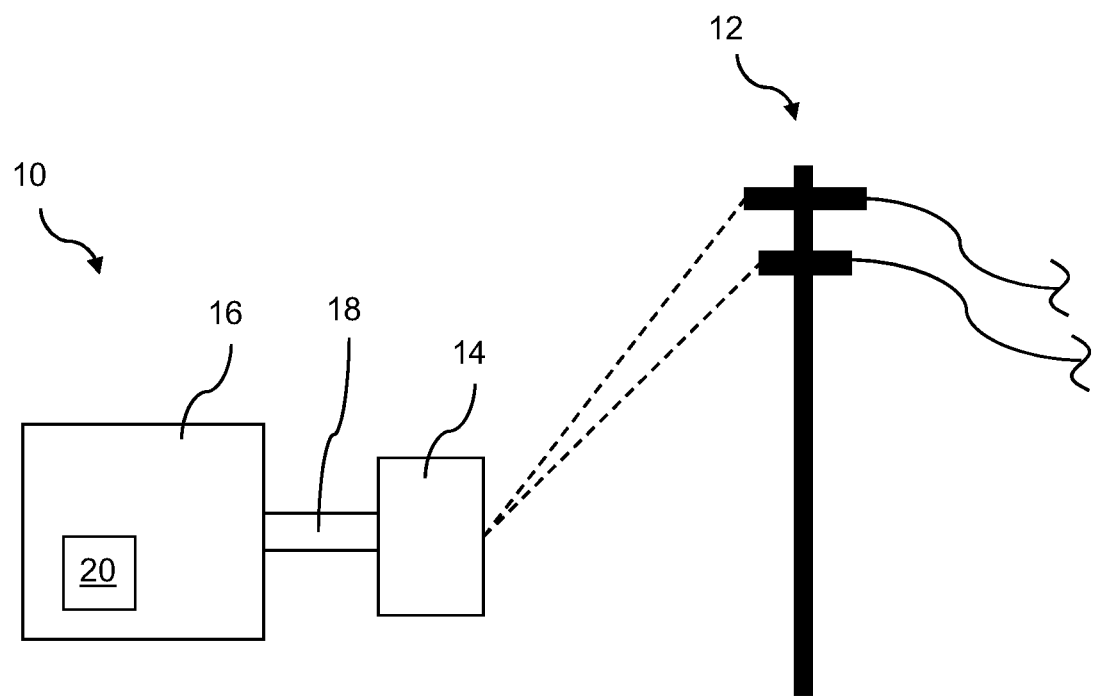
FIG. 1 schematically shows a power generation unit equipped with an internal combustion engine.

FIG. 1 schematically shows a power generation unit 10 for generating electric power to be provided to an electrical grid 12. The electric grid 12 may be of any suitable size and, for example, may be a decentral or national grid being connected to a plurality of power generation units, but is not limited to this configuration. Rather, in one configuration, the electric grid 12 may be provided with electric power generated by only one power generation unit. The power generation unit 10 may constitute or be part of a power plant and comprises at least one generator 14 which is driven by an internal combustion engine 16, also referred to as the "engine" in the following, to convert mechanical energy into electric power fed to the electrical grid 12. Accordingly, the generator 14 is electrically connected to the electrical grid 12 and coupled to the internal combustion engine 16 in a torque-transmitting manner. Specifically, the generator 14 is coupled to an output shaft 18 of the engine 16 such that, during operation of the engine 16, the generator 14 is actuated by the output shaft 18.

The engine 16 is an internal combustion engine, in particular a reciprocating engine. Specifically, the engine 16 may be a stationary gas engine which is powered with a fuel air mixture of a gaseous fuel and air, for example a mixture of natural gas and air. The engine 16 preferably comprises a plurality of cylinders, e.g. eight or twelve or eighteen cylinders, which may be arranged according to an in-line engine configuration, V-configuration or any other known cylinder configuration.

Each cylinder is provided with a combustion chamber delimited by a piston accommodated in the cylinder. The piston is configured for reciprocating and axial movement within the cylinder and is coupled to a crank shaft of the engine such that the reciprocating movement of the piston is transferred into rotating movement of the crank shaft.

During operation of the engine 16, the air fuel mixture is supplied to and ignited in each cylinder so as to produce high-temperature and high-pressure gases which apply forces to and thus axially move the associated pistons, thereby rotating the crank shaft and thus the output shaft 18 which is coupled thereto in a torque-transmitting manner. In this way, chemical energy, at first, is transformed into mechanical energy of the output shaft 18 which drives the generator 14 and then, by virtue of the generator 14, into electrical energy. In one configuration, fresh air may be mixed with the fuel medium to generate the air fuel mixture before entering the combustion chambers. Alternatively, fresh air and the fuel medium may be separately supplied into and thus mixed within the combustion chambers, e.g. by means of fuel pumps injecting the fuel medium into the combustion chambers.

The engine 16 further comprises a control unit 20, also referred to as "engine control unit" or "engine control module", which is configured to control and monitor operation of the engine 16. Specifically, the control unit 20 is of an electronic control unit type and is configured to read out measurement data from a plurality of sensors monitoring a variety of engine operating parameters. Further, the control unit 20 is configured to process and interpret the thus acquired measurement data and, in response, control actuation of a plurality of engine actuators so as to set and adjust an operating point of the engine, e.g. by controlling ignition properties, such as amount and composition of air fuel mixture to be fed to and ignited in the combustion chambers, ignition timing, valve actuation and timing, etc.

The basic structure and function of such an internal combustion engine 16 and its components, in particular the control unit 20, are well known to a person skilled in the art and are thus not further specified. Rather, a misfire classification method, also referred to as the "method" in the present disclosure, is addressed in the following which is interlinked with the present invention for detecting and specifying a misfire condition accruing during operation of the engine 16.

In the context of the present disclosure, the terms "misfire condition", "misfire" or "combustion misfire" refer to any undesired and unintended deterioration of the combustion process taking place in at least one cylinder of the engine during an operating cycle which affects performance or efficiency of the engine. For example, this may be the case when no combustion or a poor combustion takes place in at least one cylinder. A poor combustion may refer to an operating cycle in which the air fuel mixture is incompletely burned and/or a flame front generated in the air fuel mixture present in a cylinder upon ignition does not propagate in a desired manner and/or combustion is not initiated at a desired timing.

In general, the term "operating cycle" refers to a combustion cycle of one cylinder which comprises the steps of: supplying an air fuel mixture into the cylinder; combusting the air fuel mixture; and discharging exhaust gases from the engine thereafter. Typically, the operating cycle is associated to one or more piston strokes within the cylinder.

The proposed method is suitable to detect and classify different types of misfire phenomena and conditions, such as continuous and intermittent misfire events. Specifically, the term "continuous misfire" refers to a malfunction condition of a cylinder in which a misfire occurs continuously, i.e. among subsequent operating cycles of the engine. The term "intermittent misfire" refers to a malfunction condition of a cylinder in which misfire occurs intermittently among subsequent operating cycles. In other words, in a cylinder affected by such a malfunction, proper operating conditions and misfire conditions may alternate.

In the shown configuration, the control unit 20 is configured to carry out the misfire classification method which is described in the following with reference to FIGS. 2 to 6 illustrating the method in the form of a flow diagram. At first, the general method is described with reference to FIG. 2 which shows an overview of the method by illustrating individual method steps and their interaction before individual method steps and their underlying procedures are specified in more detail with reference to FIGS. 3 to 6.

Figure 2:
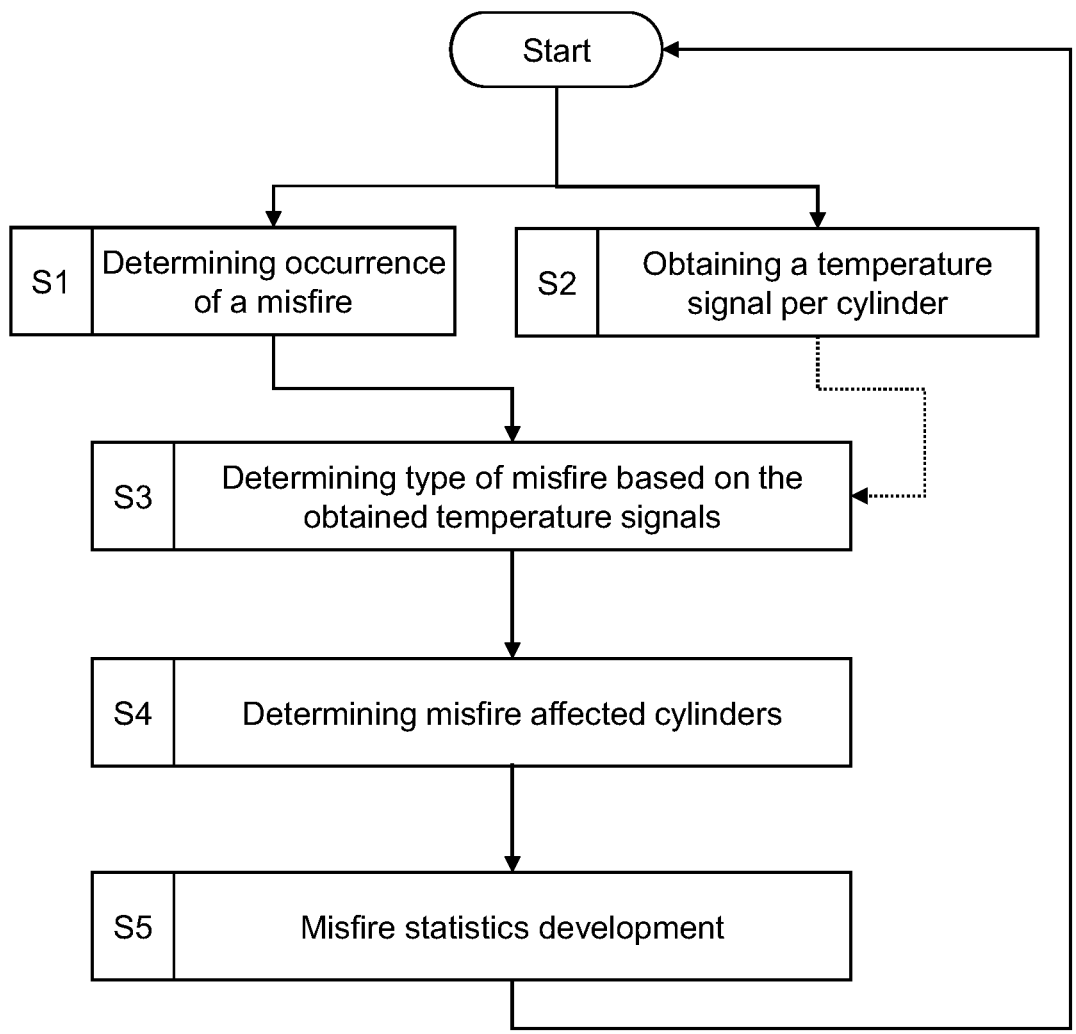
FIG. 2 schematically shows a flow diagram illustrating an overview of a misfire classification method for classifying misfires occurring during operation of the internal combustion engine depicted in FIG. 1.

FIG. 2 depicts a general overview and procedure of the proposed method for classifying misfire phenomena in the internal combustion engine 16. In the context of the present invention, it has been found that, for providing an improved engine monitoring concept or approach, e.g. which qualifies as a key enabler for improved subsystem malfunction detection and evaluation as well as emission control approaches, further information is required which goes beyond the mere detection whether a misfire phenomenon has occurred. To this end, the proposed method is intended and configured for providing additional information about misfire phenomena by classifying individual misfire conditions occurring during operation of the engine.

In the context of the present disclosure, the term "classify" refers to a process in which misfire conditions are recognized and differentiated from one another. This allows for specifying misfire phenomena, i.e. to provide additional information or a more detailed description thereof. For doing so, the proposed method, when being carried out by the control unit 20, provides information about: whether and when a misfire condition occurs or has occurred, cf. step S1; a type or nature of the misfire condition, cf. step S3; and a location where the misfire occurred, i.e. the cylinders which are or have been affected by the misfire condition, cf. step S4. In this way, the proposed method provides profound information about misfire phenomena occurring during operation of the engine, thereby allowing for an improved evaluation and analysis of misfire conditions.

As can be gathered from FIG. 2, a multi-step approach for obtaining this information is provided, according to which the occurrence of a misfire, the type of misfire, and the location of misfire are subsequently determined. Further, in the proposed method, separate algorithms may be used for obtaining this information.

The method is initiated upon starting up the engine 16. In a first step S1, the control unit 20 determines or detects the occurrence of a misfire, i.e. whether the engine 16 is subjected or has been subjected to a misfire condition. In parallel, the control unit 20 obtains a plurality of temperature signals, each of which is associated to one cylinder of the engine 16. In other words, the control unit 20 obtains a temperature signal per cylinder of the engine 16. Each temperature signal is indicative of a temperature prevailing in the associated cylinder. Specifically, each one of the temperature signals represents an in-cylinder temperature measured in the associated cylinder of the engine 16.

In case the control unit 20 determines in step S1 that a misfire has occurred, the method proceeds to step S3 of determining the type of misfire, also referred to as nature of misfire. Specifically, in this step, the control unit 20 determines the type of misfire in dependence on the obtained temperature signals, as indicated by a dotted connecting line in FIG. 2.

In the context of the present disclosure, the term "type of misfire" or "nature of misfire" refers to a misfire condition or a set of misfire conditions having a predefined characteristic or a characteristic lying within a predefined range. Specifically, the method may define or refer to at least two types of misfire or categories of misfire for classifying or differentiating misfire conditions. Accordingly, step S3 of determining the type of misfire may be performed by categorizing or classifying a considered misfire condition, i.e. determined in step S1, into one of the at least two types or categories of misfire.

After step S3, the control unit 20 proceeds to step S4 to determine or identify those cylinders which are affected by the misfire. These cylinders are also referred to as misfire affected cylinders. In other words, in this step, the control unit 20 identifies at least one cylinder of the engine 16 which experiences or has experienced the considered misfire. By doing so, the step provides a further classification of the misfire by determining its location of occurrence, i.e. in which cylinder or cylinders of the engine 16 the misfire occurs or has occurred.

Then, the method proceeds to step S5 of providing misfire statistics and thus constitutes a misfire statistics development block. In this step, the occurrences of misfire and their classification are monitored during operation of the engine 16 and processed for further usage of such information. For example, in this step, the occurrences of misfire may be accumulated for a certain time period based on their classification, e.g. based on their type and/or location, thereby providing the functionality of a counter which indicates how frequently misfire phenomena have occurred during a certain period of time during operation of the engine 16. In this way, a misfire statistic may be provided.

The misfire statistic may be used for determining proper functionality of the engine 16 and its components, such as the ignition system, or to assess whether the engine 16 should be subjected to maintenance work or further analysis. For example, the control unit 20 may accumulate the occurrence of misfire conditions, e.g. intermittent misfire condition, occurring during operation of the engine 16 to determine an occurrence frequency indicating how often misfire occurs during operation. Further, the control unit 20 may compare the thus determined frequency with a threshold and, when the determined frequency reaches that threshold, output a signal indicating that the engine is to be subjected to maintenance work or further analysis.

All the information related to the misfire statistic may be broadcast by the control unit 20 to other components of the engine 16 or systems inside or outside the power generation unit 10, e.g. via a CAN bus or Modbus or Ethernet communication link.

The procedure illustrated by steps S1 to S5 constitutes an analysis loop, which is repeatedly carried out and initiated at predetermined events. Specifically, the analysis loop may be carried out during or for an associated time period during operation of the engine in order to determine whether a misfire occurred during the considered time period and to classify it. Specifically, the analysis loop may be periodically initiated, i.e. at predetermined timings and/or at regular intervals. The time period associated to the analysis loop may refer to one or more operating cycles of the engine. Further, successive analysis loops constituted by steps S1 to S5 may be performed in a continuous loop, i.e. directly one after the other, or with a delay time therebetween.

Figure 3:
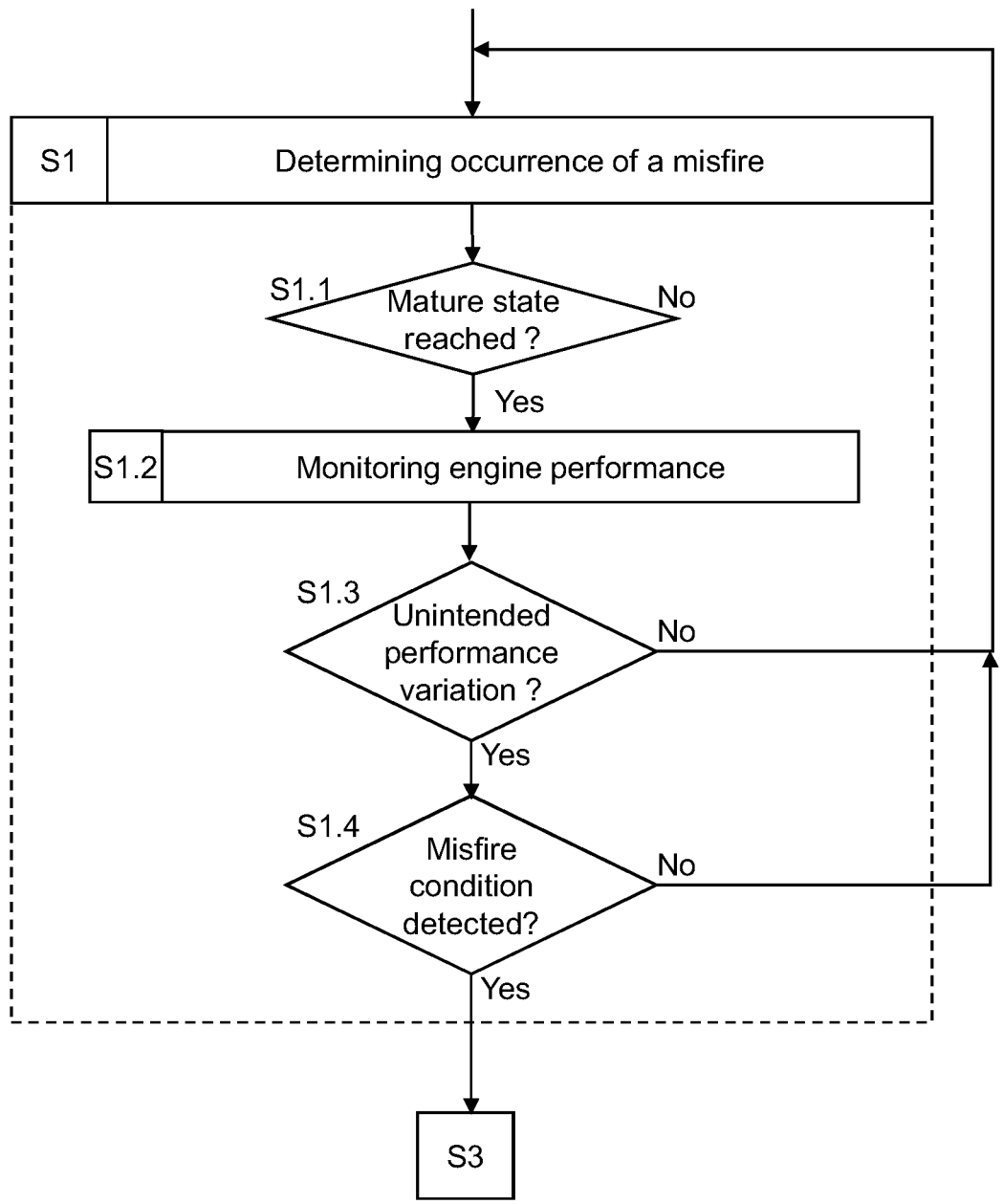
FIG. 3 schematically shows a procedure of a step of the method for determining the occurrence of misfire phenomena.
Figure 4:
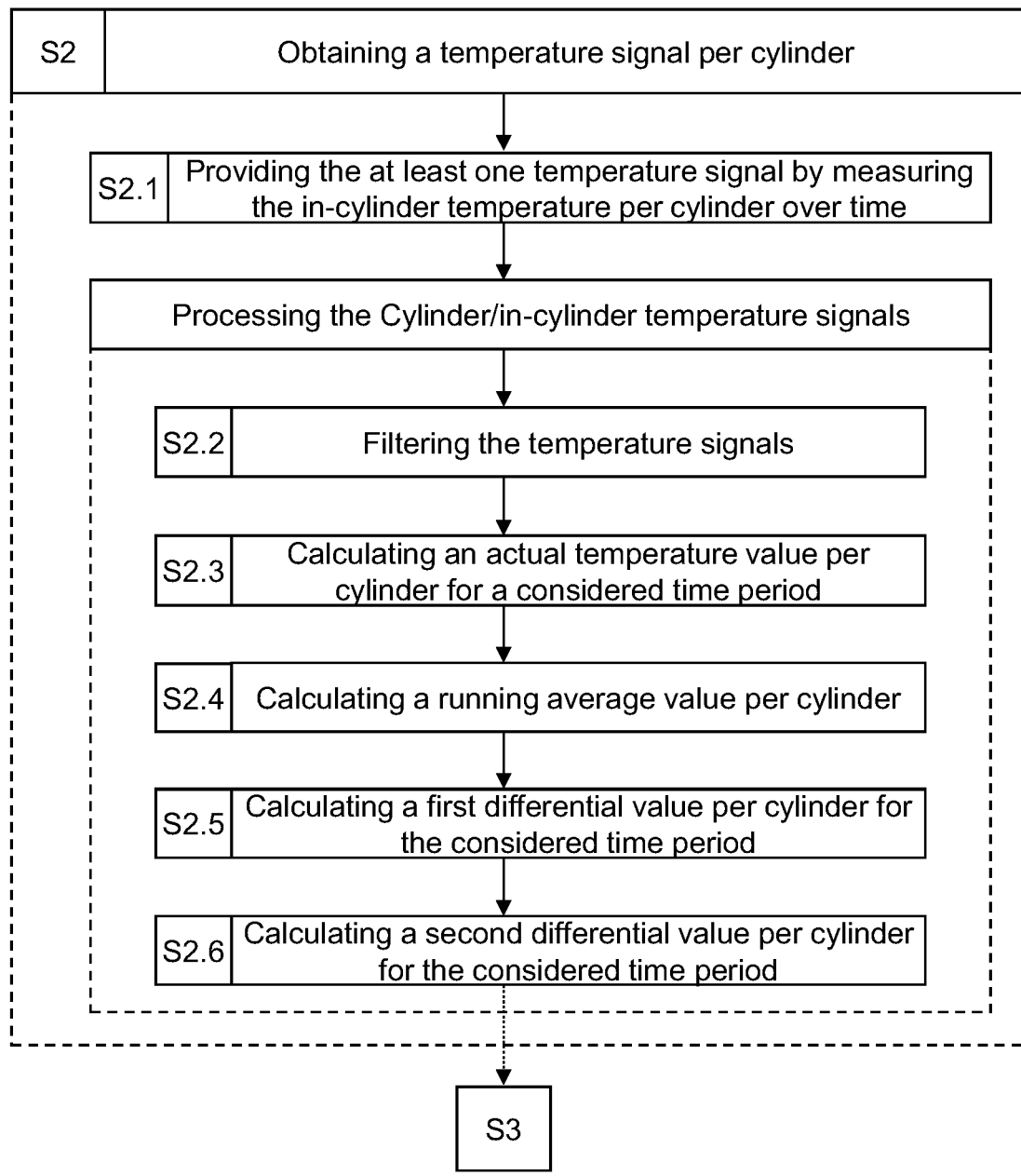
FIG. 4 schematically shows a procedure of a step of the method for obtaining a temperature signal per cylinder of the engine.

In the following, step S1 of determining the occurrence of a misfire is further specified with reference to FIG. 3, which illustrates the underlying procedure of step S1, i.e. its sub-steps and their interaction. In general, step S1 is intended and performed for determining whether the engine 16 is affected by or subjected to a misfire. This step is intended for detecting whether a misfire occurs or has occurred, but may not further classify the misfire. Rather, for further specifying and classifying the misfire, steps S3 and S4 are performed after the occurrence of a misfire is determined in step S1.

In a first sub-step S1.1, the control unit 20 determines whether the engine 16 is operated in a predetermined operating state, i.e. a warmed-up or mature operating state. In this way, it may be ensured that the engine 16 has reached a stable operating point at which the engine 16 can be run at stable conditions and at high efficiency. The predetermined operating state may further serve as a reference state of the engine 16 which allows for effectively evaluating operation thereof. In this sub-step, the control unit 20 may monitor at least one engine operating parameter, such as engine speed, engine temperature, etc., and determine that the engine is in a mature state when at least one or each one of the at least one operating parameter has reached a predetermined threshold or lies within a predetermined range.

If it is determined that the engine 16 is not in its mature state, the method returns to the beginning of step S1 and the analysis loop, i.e. step S1, is reinitiated at a predetermined delay time. However, upon determining that the engine 16 is run in the predetermined operating state, i.e. the mature state, the method proceeds to a second sub-step S1.2 in which the control unit 20 monitors operation of the engine 16, i.e. performance of the engine 16. For doing so, the control unit 20 receives or obtains at least one engine operating signal.

In the context of the present disclosure, the term "engine operating signal" refers to any parameter suitable to quantify engine performance and operation, e.g. an operating point of the engine, over time, i.e. during operation of the engine 16. Specifically, in sub-step 1.2, the control unit 20 determines at least one engine operating signal which is indicative of an engine speed or power output by the engine over time. In a further development, the control unit 20 may determine further engine operating signals being indicative of at least one of an engine load, a pressure prevailing in the engine, such as intake manifold pressure, and differential pressure at a throttle valve of the engine 16. For receiving the at least one engine operating signal, the control unit 20 is connected to at least one measurement unit which is configured to measure engine operating parameters, process the measured parameters and to transmit it in the form of the engine operating signal to the control unit 20. Alternatively, the control unit 20 may be configured to receive the measured parameters and to process it in order to generate the engine operating signal.

Thereafter, in sub-step S1.3, the control unit 20 is configured to detect an unintended performance variation of the engine during its operation in dependence on the obtained engine operating signal. In other words, in this step, the control unit 20 determines whether the engine 16 is subjected to an unintended performance variation, in particular an unintended performance drop, or not. This step refers to the associated time period. This means that the control unit 20 determines whether the engine 16 is or has been subjected to an unintended performance variation during the associated time period. For doing so, the control unit 20 analyzes the engine operating signal acquired in sub-step S1.2 which is indicative of the engine's performance during the associated period of time.

According to one configuration, during sub-step S1.3, the control unit 20 may be configured to determine an engine power signal being indicative of an actual performance or power output by the engine 16 and/or an engine speed signal being indicative of an actual engine speed, i.e. indicating a rotation frequency of the crank shaft and/or a cam shaft of the engine, in particular the number of rotations of the crank shaft and/or cam shaft per unit of time. For obtaining the engine power signal, the control unit 20 may be in communicative exchange with a first measurement unit configured for performing current transformer measurements and potential transformer measurements at the generator 14. In other words, the first measurement unit is configured to measure operation of the generator 14 and, based thereupon, to generate the engine power signal. For obtaining the engine speed signal, the control unit 20 may be in communicative exchange with a second measurement unit provided in the form of at least one pick-up sensor coupled to the crank shaft and/or cam shaft of the engine 16. Accordingly, the second measurement unit is configured to measure engine speed and, based thereupon, to generate the engine speed signal.

Further, the control unit 20 may be configured to process to thus obtained engine power signal and/or engine speed signal, e.g. by performing a filtering step for eliminating spikes and high-frequency noise from the signal and/or by calculating a derivative. Then, the control unit 20 may analyze the engine power signal and/or engine speed signal to determine whether an unintended performance variation has occurred during operation, i.e. in the associated time period. For doing so, for example, the control unit 20 may compare the magnitude of the derivative of the engine power signal and/or engine speed signal with associated thresholds or threshold ranges. Accordingly, in case the control unit 20 determines that the associated thresholds or threshold ranges are not reached, the control unit 20 does not detect an unintended performance variation and returns to the beginning of the analysis loop. However, if the control unit 20 determines that the associated thresholds or threshold ranges have been reached, the control unit 20 detects and unintended performance variation and proceeds to sub-step S1.4 of validating the measurement signal.

In sub-step S1.4, the engine operating signals obtained in sub-step S1.2 are analyzed to validate functionality of the engine 16 so as to determine whether the unintended performance variation is caused by a misfire phenomenon. In other words, the control unit 20 checks and validates whether the measured engine operating signals properly represent the operation and functionality of the engine 16. By doing so, the condition and functionality of the engine 16 as well as the measurement units employed for the method are assessed to exclude certain failure conditions which may cause or indicate an unintended performance variation of the engine, but are not related to a misfire condition. Accordingly, sub-step S1.4 may also be referred to as a qualification step.

When it is determined that the engine operating signals are not in a proper condition, the method returns to the beginning of the analysis loop. However, if it is determined that the engine operating signals are in a proper condition, the method proceeds to method step S3.

As set forth above, in parallel to step S1, step S2 is carried out in which the control unit 20 obtains a temperature signal per cylinder, wherein the temperature signal is indicative of a temperature prevailing in the associated cylinder of the engine 16. This step is further specified in the following with reference to FIG. 4, which illustrates its underlying procedure, i.e. its sub-steps and their interaction.

In a first sub-step S2.1, the control unit 20 is provided with the at least one temperature signal. In the shown configuration, the temperature signal refers to a signal obtained by measuring an in-cylinder temperature, i.e. a temperature prevailing within a housing of the cylinder which delimits a combustion chamber accommodated therein. In other words, the temperature measurement is carried out at a location which is within the cylinder housing, but spaced apart from the combustion chamber accommodated therein. Accordingly, the measurement signal may not have a direct physical significance with temperature changes experienced within the combustion chamber during the combustion process. For doing so, the method makes use of so-called in-cylinder temperature (ICT) sensors, wherein each cylinder of the engine is associated to a different one of the temperature sensors. These ICT sensors are known from the prior art and are provided in known engine configurations, but by contrast to the proposed method are not used for classifying misfire phenomena occurring during operation of the engine 16. In this way, the proposed method makes use of hardware which is already present in known engine configurations for classifying misfire phenomena, without using any extra or additional sensors or measurement techniques, thereby providing a cost effective approach.

As set forth above, the proposed approach enables to determine a type of misfire in dependence on the obtained temperature signal. In other words, in dependence or based on the measured temperature signals, the proposed method enables to classify misfire phenomena occurring during the operation of the engine 16. It is pointed out that the sensing provided by the ICT sensors may be relatively sluggish. Further, depending on the position of the sensors within the respective cylinders and the heat transfer has, there may be influences of neighboring cylinders on the value sensed. However, by the proposed method, an engine monitoring approach is provided which makes use of the known ICT sensors in order to classify misfire phenomena, particularly for determining a type of misfire. One way of doing so is described in the following.

The method comprises further sub-steps S2.2 to S2.6 of processing the obtained temperature signals. As set forth above, the temperature signals are obtained by measuring the in-cylinder temperature over time. Accordingly, the temperature signal represents a course or change of the temperature measured in the cylinder over time. In sub-step 2.2, the thus obtained temperature signals are filter so as to eliminate spikes and/or high-frequency noise therefrom. Then, in sub-step 2.3, for each cylinder and for each associated time period, an actual temperature value of the cylinder is determined which refers to an average value or maximum value of the temperature during the considered time period.

Thereafter, in sub-step S2.4, a running average value per cylinder is calculated which refers to an average value of the temperature among different operating cycles or time periods, e.g. among a preset number thereof or among all previously considered operating cycles or time periods.

In sub-step 2.5, a first differential value is provided per cylinder and per considered time period by calculating a differential between a desired temperature value and the actual temperature value per cylinder. The desired temperature value refers to a reference value for the actual temperature value and may represent a value that is expected during proper operation of the engine.

In sub-step S2.6, a second differential value is provided per cylinder and per considered time period by calculating a differential between the running average value and the actual temperature value per cylinder.

The temperature signal and the values calculated in dependence on the temperature signal are taken into account by the control unit 20 when performing method step S3 of determining the type of misfire.

Figure 5:
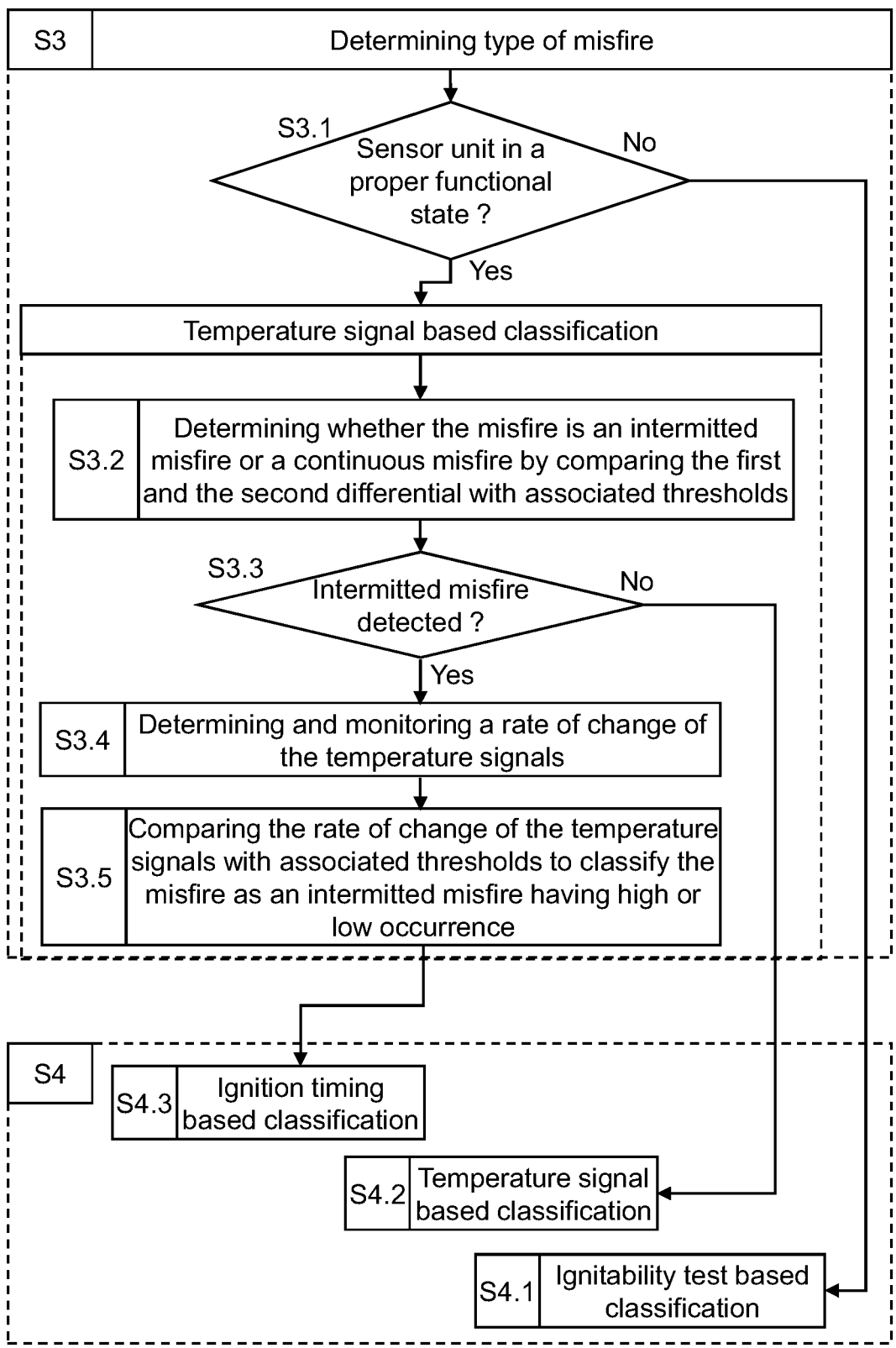
FIG. 5 schematically shows a procedure of individual steps of the method and their interaction, in particular the steps for determining a type of misfire and for determining misfire affected cylinders.
Figure 6:
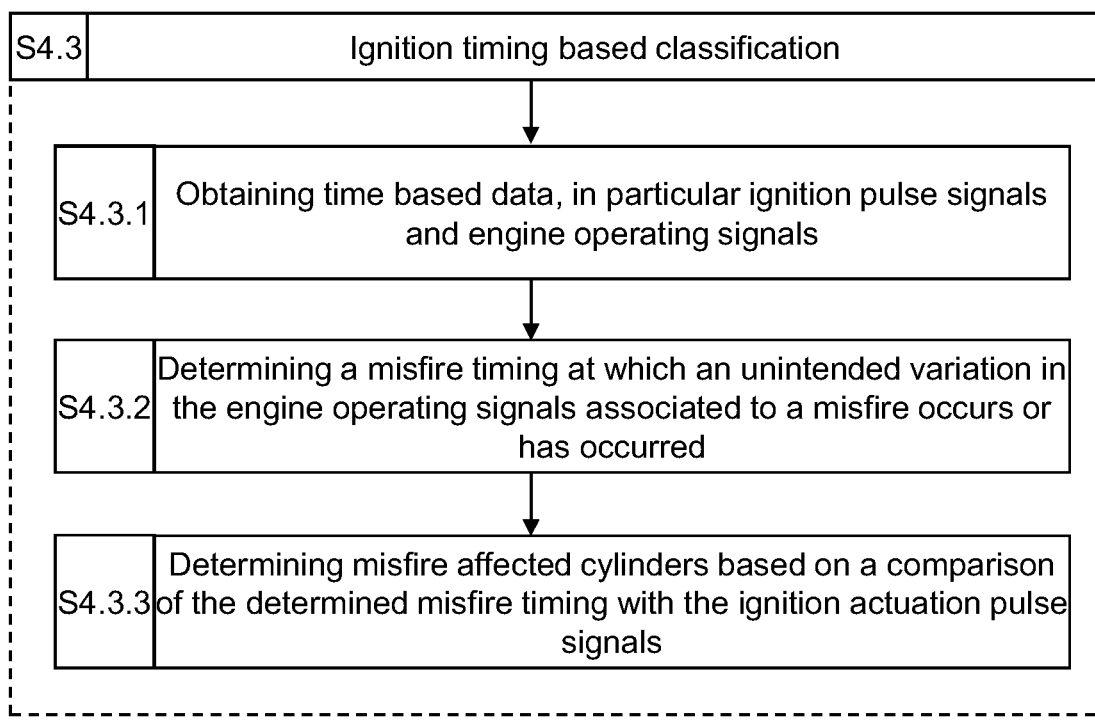
FIG. 6 schematically shows a procedure of a sub-step for performing a timing data based classification in order to determine misfire affected cylinders.

Method step S3 is further specified in the following with reference to FIG. 5, which illustrates its underlying procedure, i.e. its sub-steps and their interaction. In the first sub-step S3.1, a sensor state qualification step is performed for evaluating whether all of the ICT sensors used for obtaining the temperature signal are in a proper functional state. In this context, the set of ICT sensors is referred to as the "sensor unit". In other words, in this step, functionality of the sensor unit configured for obtaining the temperature signals is validated, i.e. to determine whether the sensor unit is in a proper functional state or not. For doing so, a plausibility check may be performed to evaluate measurements provided by the sensor unit. For example, the measurement signals provided by the sensors may be compared to reference values or threshold ranges. If the measured signals are within the threshold range, the control unit 20 may determine that the sensor unit is in a proper functional state.

In case the control unit 20 determines that the sensor unit is in a proper functional state, the method proceeds to sub-steps S3.2 to S3.4 during which a temperature signal based classification, i.e. determination of the type of misfire, is performed. However, when it is determined that the sensor unit is not in a proper state in step S3.1, the method proceeds to step S4 for determining misfire affected cylinders, in particular to sub-step S4.1 during which an ignitability test based classification is performed. In this way, a redundancy approach is provided for ensuring that, even in a state in which the sensor unit is not properly working, a classification of a misfire may be performed yet.

More specifically, in sub-step 4.1, an ignition system of the engine 16 is monitored and tested for classifying the misfire. During this step, the engine 16 is subjected to a functionality test during which the engine 16 is operated in a testing mode in which the engine 16 is run at a reduced or lowered load. More specifically, the engine 16 is activated into a safe mode in which the power of the engine is reduced. Then, an ignition angle is successively retarded for suspected cylinders in a predefined manner, i.e. one after the other for all cylinders. During each step of retarding the ignition angle, misfire statistics are developed and monitored. Based on these statistics, a misfire location is determined, i.e. those cylinders are identified which are affected by the misfire.

As set forth above, in case the control unit 20 determines that the sensor unit is in a proper functional state, the method proceeds to sub-steps S3.2 to S3.4 during which a temperature signal based classification, i.e. determination of the type of misfire, is performed. The temperature signal based classification is specified in the following with reference to FIG. 5.

At first, in sub-step S3.2, the control unit 20 determines whether the detected misfire is an intermittent misfire or a continuous misfire. For doing so, the first and the second differential values associated to the considered time period are taken into account. In other words, the decision whether the misfire is to be classified as an intermittent or a continuous misfire is made in dependence on the first and the second differential values associated to the considered time period. Specifically, for classifying the misfire as an intermittent or continuous misfire, the first and the second differential values are compared to at least one associated threshold or threshold range, respectively. For example, if it is determined that the first differential value is greater than a first threshold and that the second differential value is greater than a second threshold, the misfire may be classified as a continuous misfire. If this is not true, the misfire may be categorized as an intermittent misfire.

When an intermittent misfire is detected, the method proceeds to sub-steps S3.4 and S3.5 for further classifying the misfire, i.e. whether the misfire is an intermittent misfire with a high or a low occurrence. For doing so, the control unit 20 may determine whether a temperature balancing feature of the engine 16 or any other feature affecting the temperature signal is active. If this is not the case, the control unit proceeds to sub-step 3.4 in which a rate of change of the temperature signal is determined, quantified and monitored in the considered time period.

Specifically, in sub-step 3.4, the rate of change is analyzed and compared to a threshold in order to further specify the type of intermittent misfire. For example, a maximum rate of change during the considered time period may be determined and compared to at least one threshold. By doing so, for example, when it is determined that the maximum rate of change is below a threshold, the misfire may be classified as having a low occurrence. Accordingly, if the maximum rate of change has reached or exceeds the threshold, the misfire may be classified as having a high occurrence.

Then, the method proceeds to step S4 of determining the location of the misfire, i.e. by identifying which cylinder or cylinders are affected by the misfire. This step is performed in dependence on the result and classification obtained in method step S3. As to substance, as set forth above, in case an improper functional state of the sensor unit is determined, the method executes the ignitability test based classification according to sub-step S4.2 for localizing the misfire. However, if it is determined in sub-step S3.2 and S3.3 that the misfire is classified as a continuous misfire, the method proceeds to step S4.2 in which the misfire location, i.e. the cylinders affected by the misfire are determined based on the analysis performed in sub-step S3.2. For example, in this step, the control unit 20 may identify those cylinders, the temperature signals of which indicate the presence of a misfire so as to localize the misfire. Further, if it is determined in sub-step S3.2 and S3.3 that the misfire is classified as an intermittent misfire, sub-step S4.3 is carried out in which misfire affected cylinders of the engine 16 are identified in dependence on ignition timing based data as will be described in the following with reference to FIG. 6.

In sub-step S4.3.1, at first, time based data is obtained, in particular ignition pulse signals and engine operating signals. Specifically, the term "ignition pulse signals" refers to data indicating when and where, i.e. in which cylinder, ignition is initiated by the ignition system of the engine 16, e.g. by spark plugs of the ignition system. Further, the engine operating signals are indicative of a variation or quantity of engine speed or power over time, i.e. during operation of the engine 16. In one configuration, for obtaining the engine operating signal, the control unit 20 may access the data obtained during any one of steps S1.2 to S1.5.

Then, in sub-step S4.3.2, the control unit 20 determines a misfire timing, i.e. a point in time at which an unintended variation, in particular an unintended drop, in the engine operating signals associated to a misfire occurs or has occurred. For doing so, at first, the unintended variation in the engine operating signal is detected, before its associated point in time is determined.

Thereafter, the method proceeds to sub-step S4.3.3 in which one or more cylinders are identified as being affected by the misfire based on a comparison of the determined misfire timing with the ignition pulse signal. For doing so, the control unit 20 may determine for which cylinder the ignition pulse has been active at the identified misfire timing or prior, in particular immediately prior thereto. With increasing speed of the engine, accurately identifying a single cylinder affected by the misfire may be challenging due to the effort to be spent for synchronizing the high speed data owing to different acquisition rates. However, even at high engine speed at which the control unit 20 may not identify a single affected cylinder, the proposed method enables to determine two or more suspected cylinders, i.e. which are likely to be affected by the considered misfire, based on the firing order of the cylinders in the engine and the ignition pulse signals. In this way, even at high engine speed, the method enables to classify the misfire by pointing out suspected cylinder to localize the misfire, thereby limiting the number of cylinders which are likely to be affected by the detected misfire phenomenon.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

Accordingly, a misfire classification method for an internal combustion engine may be provided, comprising a step of determining whether the engine is subjected to a misfire or not, a step of obtaining at least one temperature signal being indicative of a temperature prevailing in a cylinder of the engine; and a step of determining a type of misfire in dependence on the obtained temperature signal. Specifically, the at least one temperature signal may represent or correspond to an in-cylinder temperature measured in an associated cylinder of the engine.

The proposed method provides an approach according to which, at first, it may be determined whether or not a misfire condition has occurred during operation of the engine. Thereafter, the misfire is classified, i.e. further specified, in dependence on the obtained temperature signal. In this way, a two-step approach is provided enabling that a misfire condition can be detected at short response times and, when a misfire has been detected, to further specify the misfire in the further course. In this way, an effective and efficient approach may be provided.

Further, the proposed method enables that the step of detecting occurrence of a misfire and of determining the type of misfire may be performed based on hardware, known configurations are already equipped with, such as engine speed sensors and ICT (In-Cylinder Temperature) sensors. Based on this approach, the method allows for providing results in real-time or near real-time, while making use of hardware, known engine configurations are already equipped with, and thus not requiring any additional measurement equipment. As a result, the proposed solution provides a cost-effective method which, in particular due to real-time measurement and misfire detection, allows for detecting the occurrence of intermittent misfire conditions.

The proposed method may be employed for misfire detection and classification in any suitable internal combustion engine, in particular reciprocating engines. For example, the method may be employed in stationary gas engines, which in particular are used for power generation, but is not limited to such an application. Such gas engines may be powered with a fuel air mixture of a gaseous fuel and air, for example a mixture of natural gas and air.

In a further development, the step of determining whether the engine is subjected to a misfire may comprise the sub-step of determining an engine operating signal being indicative of an engine speed or engine power output by the engine over time and/or the sub-step of detecting an unintended performance variation of the engine in dependence on the engine operating signal for determining whether the engine is subjected to a misfire.

Additionally or alternatively, the method may comprise a step of processing the obtained temperature signal. Specifically, the step of processing the obtained temperature signal may comprise at least one of the sub-steps: filtering the temperature signal; calculating a running average value per cylinder; determining an actual temperature value per cylinder; obtaining a first differential value per cylinder by calculating a differential between a desired temperature value and the actual temperature value; and obtaining a second differential value per cylinder by calculating a differential between the running average value and the actual temperature value.

According to a further development, the step of determining the type of misfire may be performed to determine whether the misfire is an intermittent misfire or a continuous misfire. Further, this step may be performed in dependence on at least one of the first and the second differential value. Alternatively or additionally, the step of determining the type of misfire may comprise a sub-step of determining a change or rate of change of the temperature signal, and wherein the type of misfire is determined in dependence on the determined change or rate of change. Specifically, the rate of change may be compared to a threshold in order to determine the type of misfire.

In a further development, the method may further comprise a step of validating functionality of a sensor unit configured for obtaining the at least one temperature signal, wherein when it is determined that the sensor unit is not in a proper functional state, the engine is subjected to an ignitability test during which the engine is operated at a reduced load, i.e. compared to a normal mode or mature operating state of the engine.

Alternatively or additionally, the method may comprise a step of identifying misfire affected cylinders of the engine in dependence on time based data, in particular ignition timing data. Specifically, the step of identifying misfire affected cylinders may be performed based on at least one of a time based engine operating signal being indicative of a variation or quantity of engine speed or power over time and a time based ignition pulse signal being indicative of when ignition in a cylinder is initiated during operation of the engine. These signals may be used to validate the results obtained via ICT sensors for intermittent misfires with less occurrence frequencies. Alternatively or additionally, the step of identifying misfire affected cylinders may comprise a sub-step of identifying a point in time or misfire timing at which an unintended variation in the time based operating signal associated to a misfire condition has occurred. Further, in the step of identifying misfire affected cylinders, misfire affected cylinders of the engine may be identified in dependence on a comparison of the identified point in time or misfire timing with the time based ignition pulse signal.

Furthermore, a control unit of an internal combustion engine may be provided for classifying misfire phenomena occurring during operation of the engine. The control unit may be configured for determining whether the engine is subjected to a misfire, for obtaining at least one temperature signal being indicative of a temperature prevailing in a cylinder of the engine, and for determining a type of misfire in dependence on the obtained temperature signal.

INDUSTRIAL APPLICABILITY

With reference to the Figures and their accompanying description, a misfire classification method for an internal combustion engine and a control unit of an internal combustion engine for carrying out the method are suggested. The method and the control unit as mentioned above are applicable in internal combustion engines provided, for example, as stationary gas engines. The suggested method may be performed in or for conventional internal combustion engines. Further, the suggested control unit may replace conventional control units and may serve as a replacement or retrofit part.

The invention claimed is:

1. A misfire classification method for an internal combustion engine, the method comprising:
   determining whether the internal combustion engine is subjected to a misfire;
   based on determining that the internal combustion engine was subjected to the misfire, obtaining at least one temperature signal, the at least one temperature signal being indicative of a temperature prevailing in a cylinder of the internal combustion engine; and
   determining a type of misfire, in dependence on the obtained temperature signal, the type comprising one of a continuous misfire or an intermittent misfire, wherein determining the type of misfire comprises determining a change of the temperature signal or rate of change of the temperature signal, and wherein the type of misfire is determined based at least in part on the change in the temperature signal or the rate of change of the temperature signal.

2. The method according to claim 1, wherein the at least one temperature signal represents an in-cylinder temperature measured in an associated cylinder of the internal combustion engine.

3. The method according to claim 1, wherein determining whether the engine is subjected to a misfire comprises:
   determining an engine operating signal being indicative of an engine speed or engine power output by the internal combustion engine over time; and
   detecting a performance variation of the internal combustion engine in dependence on the engine operating signal.

4. The method according to claim 1, further comprising:
   filtering the temperature signal;
   calculating a running average value per cylinder;
   determining an actual temperature value per cylinder;
   obtaining a first differential value per cylinder by calculating a differential between a desired temperature value and the actual temperature value; and
   obtaining a second differential value per cylinder by calculating a differential between the running average value and the actual temperature value.

5. The method according to claim 4, wherein the type of misfire is determined based on at least one of the first and the second differential value.

6. The method according to claim 1, further comprising:
   validating functionality of a sensor unit configured for obtaining the at least one temperature signal;
   determining that the sensor unit is not in a proper functional state; and
   performing an ignitability test during which the internal combustion engine is operated at reduced load.

7. The method according to claim 1, further comprising identifying misfire affected cylinders of the internal combustion engine in dependence on time based data.

8. The method according to claim 7, wherein identifying misfire affected cylinders is performed based on at least one of a time based engine operating signal being indicative of a course of engine speed or power over time and a time based ignition pulse signal being indicative of when ignition in a cylinder is initiated during operation of the internal combustion engine.

9. The method according to claim 7, wherein identifying misfire affected cylinders comprises identifying a point in time at which a variation in the time based operating signal associated to a misfire condition has occurred.

10. The method according to claim 9, wherein misfire affected cylinders of the internal combustion engine are identified in dependence on a comparison of the identified point in time with a time based ignition pulse signal.

11. A control unit of an internal combustion engine for classifying misfire phenomena occurring during operation of the internal combustion engine, wherein the control unit is configured for:
   determining whether the internal combustion engine is subjected to a misfire,
   based on determining that the internal combustion engine was subjected to the misfire, obtaining at least one temperature signal, the at least one temperature signal being indicative of a temperature prevailing in a cylinder of the internal combustion engine, and determining a type of misfire, in dependence on the obtained temperature signal, the type comprising one of a continuous misfire or an intermittent misfire, wherein determining the type of misfire comprises determining a change of the temperature signal or rate of change of the temperature signal, and wherein the type of misfire is determined based at least in part on the change in the temperature signal or the rate of change of the temperature signal.

12. The control unit of claim 11, wherein the temperature signal represents an in-cylinder temperature measured in an associated cylinder of the internal combustion engine.

13. The control unit of claim 11, wherein the control unit is configured to:

determine an engine operating signal indicative of an engine speed or engine power output by the internal combustion engine over time; and detect a performance variation of the internal combustion engine in dependence on the engine operating signal.

14. The control unit of claim 11, wherein the control unit is configured to:

filter the temperature signal;

calculate a running average value per cylinder;

determine an actual temperature value per cylinder;

obtain a first differential value per cylinder by calculating a differential between a desired temperature value and the actual temperature value; and obtain a second differential value per cylinder by calculating a differential between the running average value and the actual temperature value.

15. The control unit of claim 14, wherein determining the type of misfire is performed based in part on at least one of the first and the second differential value.

16. The control unit of claim 11, wherein the control unit is configured to:

validate functionality of a sensor unit configured for obtaining the at least one temperature signal;

determine that the sensor unit is not in a proper functional state; and perform an ignitability test during which the internal combustion engine is operated at reduced load.

17. The control unit of claim 11, wherein the control unit is configured to:

identify misfire affected cylinders of the internal combustion engine in dependence on time based data.

18. The control unit of claim 17, wherein identifying misfire affected cylinders is performed based on at least one of a time based engine operating signal being indicative of a course of engine speed or power over time and a time based ignition pulse signal being indicative of when ignition in a cylinder is initiated during operation of the internal combustion engine.

19. The control unit of claim 11, wherein the control unit is configured to:

identify misfire-affected cylinders by identifying a point in time at which a variation in a time-based operating signal associated with a misfire condition has occurred.

20. The control unit of claim 19, wherein misfire-affected cylinders of the internal combustion engine are identified based at least in part on a comparison of the identified point in time with a time-based ignition pulse signal.

* * * * *